United States Patent
Davison

(10) Patent No.: US 6,850,951 B1
(45) Date of Patent: Feb. 1, 2005

(54) METHOD AND STRUCTURE FOR RELATIONALLY REPRESENTING DATABASE OBJECTS

(75) Inventor: Dan Davison, San Jose, CA (US)

(73) Assignee: Amdocs Software Systems Limited, Dublin (IE)

(*) Notice: Subject to any disclaimer, the term of this patent is extended or adjusted under 35 U.S.C. 154(b) by 0 days.

(21) Appl. No.: 09/550,451

(22) Filed: Apr. 17, 2000

Related U.S. Application Data

(60) Provisional application No. 60/129,574, filed on Apr. 16, 1999.

(51) Int. Cl.[7] .............................................. G06F 17/00
(52) U.S. Cl. ............................ 707/102; 707/101; 707/3
(58) Field of Search ............................... 707/100, 101, 707/102, 3, 10, 2, 4, 1; 705/10; 706/53

(56) References Cited

U.S. PATENT DOCUMENTS

| | | | | |
|---|---|---|---|---|
| 5,133,068 A | * | 7/1992 | Crus et al. .................. | 707/100 |
| 5,257,185 A | * | 10/1993 | Farley et al. ................ | 707/100 |
| 5,675,785 A | * | 10/1997 | Hall et al. ................... | 707/102 |
| 6,279,007 B1 | * | 8/2001 | Uppala ........................ | 707/101 |
| 6,336,123 B2 | * | 1/2002 | Inoue et al. ............. | 715/501.1 |
| 6,374,252 B1 | * | 4/2002 | Althoff et al. .............. | 707/102 |

FOREIGN PATENT DOCUMENTS

| | | | | | |
|---|---|---|---|---|---|
| JP | 62054328 A | * | 3/1987 | ............. | G06F/7/22 |
| JP | 11031147 A | * | 2/1999 | ........... | G06F/17/30 |

* cited by examiner

*Primary Examiner*—Jean M. Corrielus
*Assistant Examiner*—Gwen Liang
(74) *Attorney, Agent, or Firm*—Haynes and Boone, LLP

(57) ABSTRACT

In the present invention, a database structure is defined such that a database table having a plurality of objects each having an associated data is formed. A second table containing the relationship of one of the objects to another of the objects in a parent-child relationship is formed. A summary database table receives the data from the second database table and summarizes the data therefrom. By separating the relationship from the underlying data, and with the definition of each parent and child, execution of retrieval of information from the database structure is extremely efficient and fast.

8 Claims, 3 Drawing Sheets

| OBJECT | NUMBER | DIRECT | DATA |
|---|---|---|---|
| A | 0 | 0 | |
| B | 1 | 0 | |
| C | 2 | 0 | |
| D | 3 | 0 | |
| E | 4 | 1 | |
| F | 5 | 1 | |
| G | 6 | 2 | |
| H | 7 | 3 | |

METHOD AND STRUCTURE FOR RELATIONALLY REPRESENTING DATABASE OBJECTS

This application claims the benefit of U.S. Provisional Application No. 60/129,574, filed on Apr. 16, 1999, entitled "COMPLEX DATABASE STRUCTURE", which is incorporated herein by reference.

This application also contains copyrighted material, Copyright 1999, Clarify Inc. The copyright owner has no objection to the reproduction by anyone of the patent document or the patent disclosure, as it appears in the Patent and Trademark Office patent file or records, but otherwise reserves all copyright rights whatsoever in the copyrighted material.

TECHNICAL FIELD

The present invention relates to a relational data structure corresponding to a complex hierarchy relationship. More particularly, the present invention relates to a relational data structure corresponding to elements or database objects to provide defining simultaneous multiple hierarchies and to provide simplified location and access to nodes in a hierarchy.

BACKGROUND OF THE INVENTION

Databases are well-known in the art. Typically, databases store elements or objects that contain data and contain the relationship from one object to another. The database can then be queried by conventional Structured Query Language ("SQL") to extract information including summary information therefrom.

An example of a database structure is a tree structure, which contains zero or more nodes that are linked together in a hierarchical fashion. The topmost node has been called the root. The root could have zero or more child nodes, connected by edges or links. The root is the parent node to its children. Each child node can in turn have zero or more children of its own. Nodes sharing the same parent are called siblings. Every node in a tree has exactly one parent node (except for the root, which has none), and all nodes in the tree are descendants of the root node. These relationships have set out that there is one and only one path from the root node to any other node in the tree.

There are a number of shortcomings of such database structures. For example, in order to process a summary level information of the data at a lower child level, object A level, such structures must be iteratively processed by summarizing the data from objects in the search path. This iteration for retrieval is inefficient and cumbersome. Further, such structures shown do not allow both single parent and multiple parent hierarchies. In addition, it does not support a graph database structure.

Thus, there is a need to overcome the foregoing difficulties of such database structure.

SUMMARY OF THE INVENTION

Provided is a method of creating a relational database having a plurality of objects, each having an associated data is disclosed. A first database table having a plurality of entries, with each entry representing an object with an associated data is formed. A second database table having a plurality of entries, each entry defining a relationship between the plurality of objects is also formed. As another aspect, the present invention relates to an article of manufacture in which a computer usable medium having a computer readable program code embodied therein is configured to cause a computer to execute the foregoing.

DETAILED DESCRIPTION

Figures 1, 2:
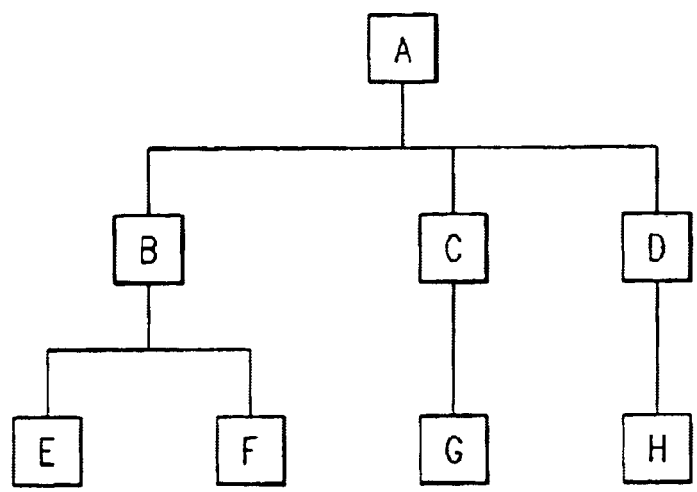
FIG. 1 is a schematic diagram showing a complex tree-like hierarchical database structure to which the present invention can represent.
FIG. 2 is a database table showing the relationship of the database objects along with the data stored in the database table.

Referring to FIG. 1, there is shown a hierarchical type of database structure. As is shown in FIG. 1, object A or database element A has a direct relationship to objects B, C, D. As used hereinafter, elements B, C, D will be referred to as objects. Object B has objects E and F directly related thereto. Object C is directly related to object G. Object D is directly related to object H. The database structure shown in FIG. 1 is typically termed a tree structure and has a hierarchical relationship between objects A, B, C, D, E, F, G and H. Typically, the database structure shown in FIG. 1 can represent, for example, sales data. Thus, objects E, F, G and H can represent sales information in a certain locality. Objects B, C and D may be summaries of the sales in a certain region. Object A may then be a summary of a higher order region such as a country.

The relationship of the objects A–H in the structure is shown in FIG. 2. Each object is represented as a row in a database table 8. In one of the columns, the object is represented by a unique number. Thus, object A is assigned the number 0, object B is assigned the number 1, etc. In another column, the objects to which the particular object in that row has a direct relationship is so indicated. Thus, object A, having the number 0, has a direct relationship with objects B, C and D having the numbers 1, 2 and 3 respectively. Similarly, object B, having the number 1, has a direct relationship with objects E and F Z with numerical identifiers of 4 and 5 respectively. Similarly, object C, bears a direct relationship to object G having a numerical identifier of 6. Last but not least is object D having a direct relationship with object H having a numerical identifier of 7. In this manner, the relationship of each of the objects to one another is defined in this particular database table. Other columns in each of the rows stores the data associated with that particular object.

Figure 3:
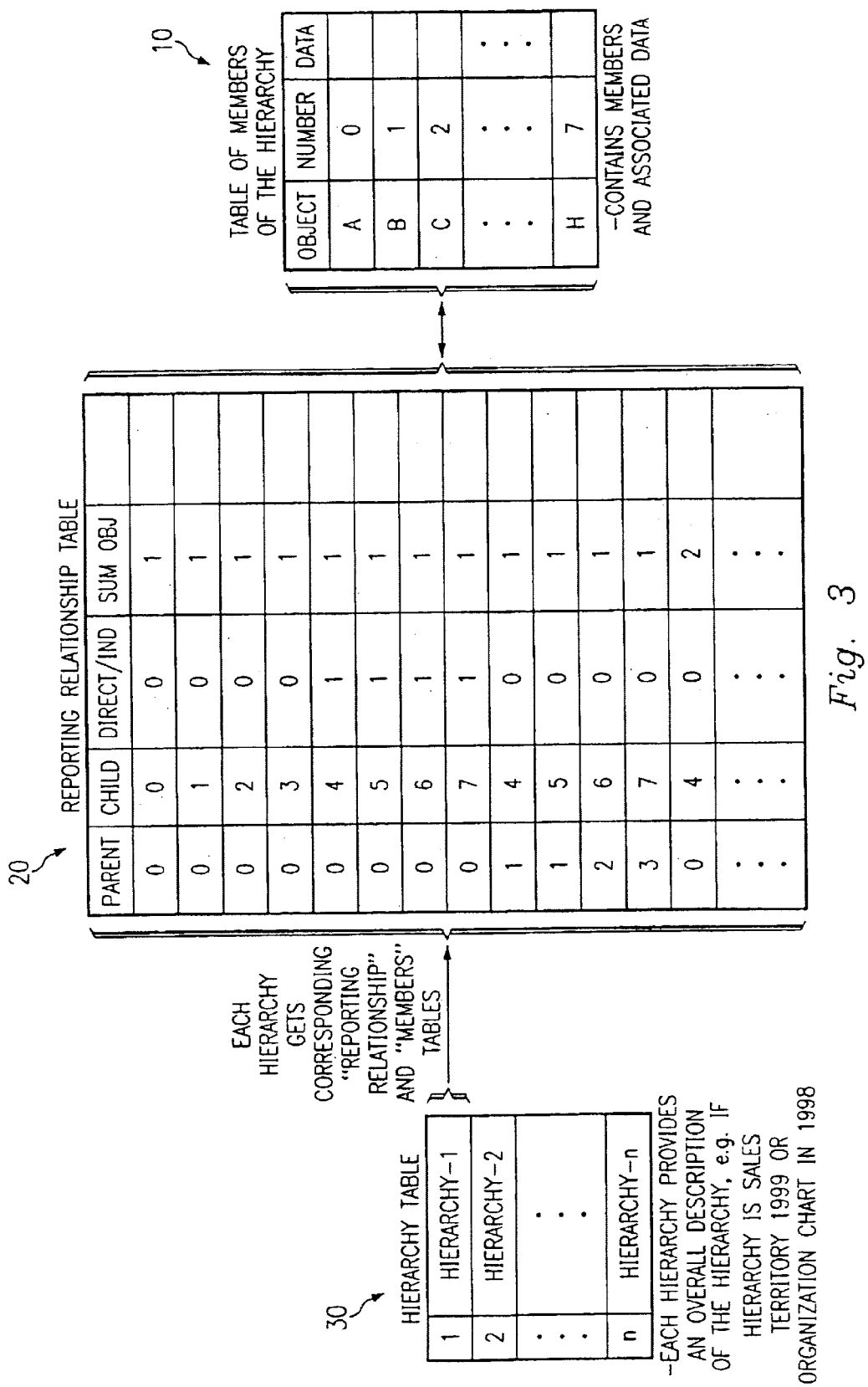
FIG. 3 is a block level diagram of one embodiment of the present invention.

Referring to FIG. 3 there is shown a schematic diagram of the relationship of the database structure to implement the method and apparatus of the present invention. A first table of members 10 has a plurality of entries. Each entry is defined, e.g. by one row and comprises a database object along with its associated data. The first table 10 has a listing of only of each object and its associated data. Thus, for the hierarchical relationship shown in FIG. 1, the table 10 contains entries for objects A–H and their associated data.

A second table of reporting relationships 20 is constructed. The second table 20 has a plurality of entries with each entry showing each of the relationships existing in the complex hierarchical structure to which the first table 10 relates. Thus, for example, for the hierarchical structure shown in FIG. 1, there is the following relationship between the various database objects:

| Parent | Child |
|--------|-------|
| A | A |
| A | B |
| A | C |
| A | D |
| A | E |
| A | F |
| A | G |
| A | H |
| B | E |
| B | F |
| C | G |
| D | H |

Since there are twelve possible relationships between the database objects of FIG. 1, twelve rows or entries are established. Each entry identifies the parent of that relationship and its associated child. Further, each entry indicates whether that relationship is a direct ("0") or indirect ("1") relationship. Thus for the parent-child relationships of A–B, A–C, A–D, these are direct relationships. For the parent child relationships of A–E, A–F, A–G and A–H, these are indirect relationships. Similarly, for the relationships of B–E, B–F, B–G, and B–H, these are direct relationships. In each entry is an indication of the databases structure to which this relationship represents. Thus, for example, the twelve entries relate to the hierarchical structure shown in FIG. 1, and has the relationship of the present invention can be very flexible, the database objects shown in FIG. 1, may be rearranged and have a different relationship. In that event, if, for example, in the second database structural relationship, object E represented by the numerical identifier 4 reports directly to object A, and if it is desired to represent that relationship, in the same table that representation can be set forth with a "Sum Obj" of "2" showing that it represents a different hierarchical structure.

A third table of hierarchy 30 is a summary of all the various possible database structural relationships to which the elements from second table 20 can be summarized. Thus, each row in the third table 30 represents a hierarchy and is a summary of the data in the rows in the second table 20 having rows identified with the identifier "1", in the "Sum Obj" column. An identifier 2 in a row in third table 30 would summarize the relationships from those rows in which there is a column entry labeled "2" for "Sum Obj", and would represent a different hierarchy. Thus, the first row in third table 30 is a summary of the data in which the objects have the relationship shown in FIG. 1.

The operation of the database structure shown in FIG. 3 will now be described. First, given any node in any hierarchy, one can retrieve the nodes that report to that node with a SQL statement and executed with one round trip. Thus, if it is desired, for example, to determine the data summarized into object B at data node identified as 1, one has to do is summarize all the data in which node 1 (object B) is listed as the parent in second table 20, retrieving the identification of the child that reports to that node and summarizing the data from the first table 10.

Similarly, to obtain a summary of the data at node 0 or database object A, then the second table 20 is accessed and the entries in which 0 (object A) is the parent are referenced and the data is retrieved from the associated child from the first table 10 and summarize those. Therefore, retrieval of a node of the objects that report to it can be achieved by a SQL statement providing expeditious searches.

Second, an advantage of the present invention is that it allows definition of simultaneous multiple hierarchies on the database tables without having to use dedicated database relations for any of the hierarchies. As previously discussed, it is possible, for example, for the database objects shown in FIG. 1 to have the relationship shown in FIG. 1. It is also possible for those same database objects to have a different relationship in which object E reports directly to object A. This example is shown in FIG. 3 wherein the same database objects in first database table 10 are shown in hierarchical relationship of 1 (under the "Sum Obj" column) and also the same relationship is established with a second hierarchical structure in which a 2 appears in the "Sum Obj" column. Thus, without the need to use dedicated database relationships for any of the hierarchies, one can establish simultaneous multiple hierarchies on the same database objects.

Third, with the present invention where the relationship is separate and apart from the underlying data, single parent and multiple parent hierarchies can also be defined. FIG. 1 shows a structural relationship of a single parent hierarchy. A multiple parent hierarchy would be, for example, with the structural relationship of FIG. 1 inverted in which objects E, F, G, and H are the parents and the children are B, C, D, and A. Database object B would have multiple parents reporting to both database object E and database object F. Establishing such a relationship in the database structural relationship of the present invention is simply a matter of defining the appropriate database object under the column of parent and the appropriate database object under the column of child. Such a structure would support both tree and graph type structures.

From the foregoing, it can be seen that with the relationship defined separately from the underlying data, and with the definition of each parent and child, execution of retrieval of information from the database structure is extremely efficient and fast. Moreover, for example, if the hierarchy is to change, the definition change reformats the hierarchy by modifying the second table 20, accordingly. In contrast, in the database table 8, one must change the database table in which the data is also present. In the present invention, where the data is separate from the relationship, data integrity during maintenance can be preserved. Further, the functions of data entry and data maintenance can be separated.

Figure 4:
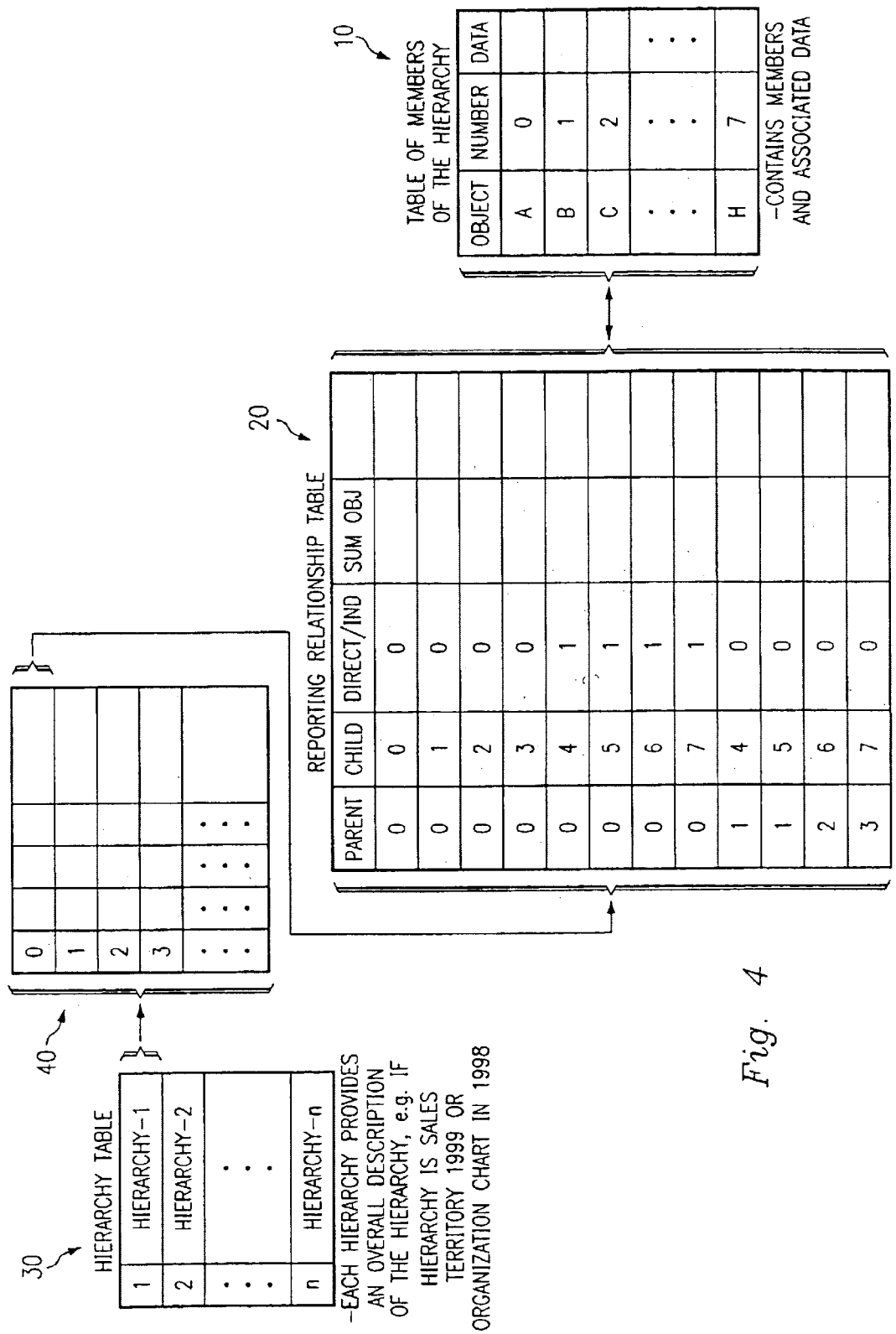
FIG. 4 is a schematic diagram of another embodiment of the present invention.

Referring to FIG. 4 there is shown yet another embodiment of the present invention. As before, a first table 10 stores each of the database objects and their associated data. A second table 20 stores each of the relationships in a parent-child definition for the hierarchy to which the database objects stored in first table 10 represents. As previously discussed, second table 20 may store relationships representing more than one complex hierarchy relationship to which the database objects of first table 10 represent. Similar to FIG. 3, each row of a third table 30 represents a different complex hierarchy structure to which the database objects stored in the first table 10 represent.

The difference between the database structure relationship shown in FIG. 4 and that shown in FIG. 3 is that there is an intermediate fourth table 40 between the second table 20 and the third table 30. Each row in the fourth table 40 relates to a row in the third table 30 to a row in the second table 20. For example, in accounting, this may be termed a sub-total. Thus, for example, each row in the fourth table ("a Sub-Total") 40 may relate a row in third table 30 ("a Grand Summary") to the rows in the second table 20.

In the preferred embodiment the method of the present invention is practiced by a computer operating a computer readable program stored on a computer usable medium, such as a disc drive. The pertinent portion of the method of the present invention can be practiced by the following code, written in Clarify® Basic, a language that can be executed under any of the following operating systems: Microsoft NT, Sun Solaris, HP Unix, and AIX (IBM). The relevant objects are table rollup (one row for the hierarchy description), table loc_rol_itm (all the "reports to" parent child rows), and table_inv_locatn (the objects being rolled up into this particular hierarchy). As an example, note the database relation from rollup to table_cycle_count. This allows a particular inventory cycle count to be tied to a particular rollup of inventory locations.

```
Option Explicit
'
'************************************************************************
'
'  8431.cbp
'
'  CB code for Inventory Count Location window
'
'
'************************************************************************
#DECLARESTRINGS lcb
#DECLARESTRINGS oab
#INCLUDE LE.cbh
#INCLUDE cbconst.cbh
#INCLUDE utils.cbh
#INCLUDE CL.cbh
Declare Function LEIsAChild( le As LEType ) As Boolean
Declare Sub lcbGetRollup( )
Declare Sub lcb_AddRolItm ( newParentRec As Record, newChildRec
As Record, rollupRec As Record, parentDepth as Long )
Declare Function lcb_MeetAllRollupConditions ( rollupView As
String, newParentRec As Record, newChildRec As Record, rollupRec
As Record ) As Boolean
Declare Sub lcb_Delete_obj_rol_itm ( newChildRec As Record,
rollupRec As Record)
Declare Sub lcb_GetDataToValidateAdd ( viewName As String,
currParent As Record, currChild As Record, rollupRec As Record )
Declare Sub lcb_ValidateParent ( currParent As Record, rollupRec
As Record, currParentLocRec As Record )
Declare Function lcb_IsItself ( newParentRec As Record,
newChildRec As Record ) As Boolean
Declare Function lcb_IsParent ( pList As List, newParentRec As
Record ) As Boolean
Declare Function lcb_IsChild ( cList As List, newChildRec As
Record ) As Boolean
Declare Function lcb_InOtherInventoryRollup (newChildRec As
Record, rollupRec As Record) As Boolean
Declare Function lcb_IsSomeWhereInRollup ( newChildRec As Record
) As Boolean
global const RECORD_TYPE = "rollup"
' Form specific constants
global gchildCList          As List        ' new child's
children list
global gchildPList          As List        ' new child's parent
list
global gparentCList         As List        ' new parent's
children list
global gparentPList         As List        ' new parent's parent
list
Dim childCList              As List        ' new child's
children list
Dim childPList              As List        ' new child's parent
list
Dim parentCList             As List        ' new parent's
children list
Dim parentPList             As List        ' new parent's parent
list
Dim otherInvRollupParentList  As List      ' check for new child
loc in other Inv rollup list
Dim otherInvRollupChildList   As List      ' check for new child
loc in other Inv rollup list
Dim invRollupList           As List        ' current rollup list
Dim nodeKeyRemoved          As Long        'Store the node key
that was removed
Dim nodeDepthRemoved        As Long        'Store the node depth
that was removed
Dim nodX                    as Long
Dim imageVal                as Long
Dim selectedImageVal        as Long
const tvwFirst    = 0    'First Sibling.
const tvwLast     = 1    'Last Sibling.
const tvwNext     = 2    'Next sibling.
```

-continued

```
const tvwPrevious  = 3     'Previous sibling.
const tvwChild     = 4     'Child.
' ----------------------------------------------------------------------
' Populate UDT
' ----------------------------------------------------------------------
Sub FillLEHelp( le As LEType )
    Set le.frm = Me
    Set le.cobj = Cobj_recLocRollup
    Set le.cobj_leudt = Cobj_leudt
    Set le.clb = clbCbxLocRollups
    Set le.cbx = CBX_SelectLocRollup
    le.rec_type = RECORD_TYPE
    le.user_rec_type = LCB_COUNTLOC_USER_TYPE
    le.edit_from_list = TRUE
    le.dont_prefill = TRUE
    'le.fld_objid = "objid"
    Set le.btn_find = btnCbxfRollup
    Set le.btn_done = DONE
    Set le.btn_add = btnAdd
    Set le.btn_replace = btnReplace
End Sub
Sub FillLE( le As LEType )
    Call FillLEHelp( le )
End Sub
' ----------------------------------------------------------------------
' Make sure required fields are filled in
' ----------------------------------------------------------------------
Sub CheckRequired ( )
    Dim le As LEType
    Call FillLE( le )
    Dim MyList As New List
    Set glst_reqd = MyList
    Call AddToReqdList( Me )
    If glst_reqd.Count > 0 Then
            Call MissingMsg( )
            Call LESetSaveOK( le, False )
    End If
End Sub
' ----------------------------------------------------------------------
' Enable other buttons
' ----------------------------------------------------------------------
Sub ProperEnabling( )
    Dim locationRec        as Record
    Dim nodeLocationRec    as Record
    Dim rollupRec          as Record
    Set nodeLocationRec = Cobj_recSelectLocBinNode.Contents
    Set rollupRec = Cobj_recLocRollup.Contents
    btnAdd.Enabled = ZeroOBJID( Cobj_recLocRollup.Contents )
    btnReplace.Enabled = Not ZeroOBJID(
Cobj_recLocRollup.Contents )
    btnAdd.default = btnAdd.Enabled
    btnReplace.default = btnReplace.Enabled
    btnRemoveRollup.Enabled = btnReplace.Enabled
    btnAddParent.Enabled = clbCbxCountLocs.SelCount = 1 and
nodeLocationRec.GetField("loc_objid") = 0
    btnAddChild.Enabled = clbCbxCountLocs.SelCount > 0 and
nodeLocationRec.GetField("loc_objid") <> 0
    btnAddSibling.Enabled = clbCbxCountLocs.SelCount > 0 and
nodeLocationRec.GetField("loc_objid") <> 0
    btnRemove.Enabled = nodeLocationRec.GetField("loc_objid") <>
0
    If rollupRec.GetField("objid") = 0 Then
        Me.DisableControls "PBEFCbxeCountLoc", "btnCbxfCountLoc"
    Else
        Me.EnableControls "PBEFCbxeCountLoc", "btnCbxfCountLoc"
    End If
    If nodeLocationRec.GetField("loc_objid") <> 0 Then
        Me.DisableControls "ddlRollupType"
    Else
        Me.EnableControls "ddlRollupType"
    End If
End Sub
' ----------------------------------------------------------------------
' Adhoc handler for Rollups
' ----------------------------------------------------------------------
Sub HandleAdhocRollup( )
    CBX_SelectLocRollup.ClearPreFilter "object_type", ""
    CBX_SelectLocRollup.AppendPreFilter "object_type",
```

-continued

```
"focus_type", "is equal to", 228
End Sub
' ----------------------------------------------------------------------------------------------------
' Adhoc handler for Locations
' ----------------------------------------------------------------------------------------------------
Sub HandleAdhocLocation( )
    CBX_SelectCountLocs.ClearPreFilter "CountLoc_loc_name", ""
    CBX_SelectCountLocs.ClearPreFilter "CountLoc_loc_type", ""
    CBX_SelectCountLocs.ClearPreFilter "",
"locatn2inv_role:role_name"
    CBX_SelectCountLocs.AppendPreFilter "",
"locatn2inv_role:role_name", "is equal to", LCB_LOCATED_AT_ROLE
    CBX_SelectCountLocs.ClearPreFilter "class", "inv_class"
    CBX_SelectCountLocs.AppendPreFilter "class", "inv_class", "is
equal to", 0
End Sub
' ----------------------------------------------------------------------------------------------------
' Clear all related data
' ----------------------------------------------------------------------------------------------------
Sub ClearRelatedRollup( )
    'Call ClearLOR( Cobj_lorLocRollup )
    Call ClearCobj( Cobj_recLocRollup, "rollup" )
    clbCbxLocRollups.Unselect
End Sub
Sub ClearRelatedCountLoc( )
    Call ClearLOR( Cobj_lorLocatnView )
    Call ClearCobj( Cobj_recLocatnView, "locatn_view" )
    clbCbxCountLocs.Unselect
End Sub
' ************************************
' STANDARD EVENT HANDLERS
' ************************************
' ----------------------------------------------------------------------------------------------------
' Load the form
' ----------------------------------------------------------------------------------------------------
Sub Form_Load( )
    Dim iconid      As Long
    Dim colorval    As Long
    Dim le          As LEType
    Call InitLOR  ( Cobj_lorLocRollup )
    Call InitCobj ( Cobj_recLocRollup, "rollup" )
    Call InitLOR  ( Cobj_lorLocatnView )
    Call InitCobj ( Cobj_recLocatnView, "locatn_view" )
    Call InitCobj ( Cobj_recSelectLocBinNode, "locatn_view" )
    Me.DisableControls "btnUseDone"
    Dim rollupTypList        as New List
    rollupTypList.ItemType = "string"
    rollupTypList.AppendItem LCB_COUNT_PT_ROLLUP,
LCB_PHYSICAL_ROLLUP, LCB_OPER_ROLLUP
    Cobj_lopRollupType.Fill rollupTypList
    Cobj_lopRollupType.Refresh
    ddlRollupType.SetSelected 0
    Call FillLEHelp(le)
    Call LEListLoad( le )
    Call ClearRelatedRollup
    Call ClearRelatedCountLoc
    Call ProperEnabling
    'Mask color
    colorval = LCB_CNT_LOC_COLORVAL
    'set imagelist id in the resource dll
    iconid = LCB_CNT_LOC_IMAGELIST
    tvwCountLoc.SetImageList iconid, colorval
    'set selected and non-selected image Icons
    imageVal = LCB_LOC_TVW_IMAGE
    selectedImageVal = LCB_LOC_SELECTED_TVW_IMAGE
    'set overlay image index mapping
    tvwCountLoc.SetOverlayImage LCB_TVW_OVERLAY_IMAGE,1
    CBX_SelectCountLocs.AppendDefaultSort
"locatn2inv_role:inv_role2site:site_id",
"locatn2inv_role:inv_role2site:site_id", "ascending"
    CBX_SelectCountLocs.AppendDefaultSort "sort_loc_name",
"location_name", "ascending"
    nodeKeyRemoved = 0
    nodeDepthRemoved = 0
    On Error Goto ErrHandler
    CBX_SelectLocRollup.SetAdhocCellReadOnly "use_type"
    On Error Goto 0
Exit Sub
ErrHandler:
```

-continued

```
        Resume Next
End Sub
' --------------------------------------------------------------------
' Done button is clicked
' --------------------------------------------------------------------
Sub Done_Click( )
    Dim le As LEType
    Call FillLE(le)
'Notify account location window so that it can refresh its data
    Set grec_le = Cobj_recLocRollup.Contents
    Me.NotifyParent msgLEEditMoveRecord, "rollup"
'Standard close LE window logic
    Call LEListDoneClick( le )
End Sub
' --------------------------------------------------------------------
' Rollup Find button is clicked
' --------------------------------------------------------------------
Sub btnCbxfRollup_Click( )
'Need to clear the currently selected rollup's treeview
    tvwCountLoc.Clear
    Call ClearRelatedCountLoc
    Call ClearCobj( Cobj_recSelectLocBinNode, "locatn_view" )
'Need to add application required prefilters
    Call HandleAdhocRollup
'Now do the Select CBX lookup
    Dim le As LEType
    Call FillLE(le)
    Call LEListFindClick( le )
    Call ProperEnabling
End Sub
' --------------------------------------------------------------------
' Location Find button is clicked
' --------------------------------------------------------------------
Sub btnCbxfCountLoc_Click( )
    Call HandleAdhocLocation
    CBX_SelectCountLocs.Regenerate
    Call ProperEnabling
End Sub
' --------------------------------------------------------------------
' Rollup Lookup button is clicked
' --------------------------------------------------------------------
Sub PBEFCbxeRollup_Click( )
'Need to clear the currently selected rollup's treeview
    tvwCountLoc.Clear
    Call ClearRelatedCountLoc
    Call ClearCobj( Cobj_recSelectLocBinNode, "locatn_view" )
    Call ClearRelatedRollup
'Need to add application required prefilters
    Call HandleAdhocRollup
'Now let the CBX do the rest of the filtering
    Me.DoDefault
    Call ProperEnabling
End Sub
' --------------------------------------------------------------------
' Location Lookup button is clicked
' --------------------------------------------------------------------
Sub PBEFCbxeCountLoc_Click( )
'Need to add application required prefilters
    Call HandleAdhocLocation
'Now let the CBX do the rest of the filtering
    Me.DoDefault
End Sub
' --------------------------------------------------------------------
' When New is clicked, post the New Account and Location Window
' --------------------------------------------------------------------
Sub btnAddNew_Click( )
    Dim mystr_new as string
    App.GetString OAB_GSL_CASE_STS_NEW, mystr_new
    App.ExecuteMenu mystr_new, LCB_ACCT_LOC_MENU_OPTION
End Sub
' --------------------------------------------------------------------
' When a Rollup Row is clicked, show data and sync with detail form
' --------------------------------------------------------------------
Sub clbCbxLocRollups_Click( )
    Dim le As LEType
    Call FillLE( le )
    Call LEListClbClick( le )
    tvwCountLoc.Clear
    Call ClearRelatedCountLoc
```

-continued

```
        Call ClearCobj( Cobj_recSelectLocBinNode, "locatn_view" )
        Call lcbGetRollup ( )
        Call ProperEnabling
End Sub
' ----------------------------------------------------------------------------------------
' When a Location Row is clicked, show data and sync with detail form
' ----------------------------------------------------------------------------------------
Sub clbCbxCountLocs_Click( )
        Call ClickOTM ( Cobj_recLocatnView, clbCbxCountLocs )
        Call ProperEnabling
End Sub
' ----------------------------------------------------------------------------------------
' Node Events
' ----------------------------------------------------------------------------------------
Sub tvwCountLoc_Collapse(nodeID as Long)
End Sub
Sub tvwCountLoc_Expand(nodeID as Long)
End Sub
Sub tvwCountLoc_NodeClick(nodeID as Long )
        Dim locBinNodeRec as New Record
        Set locBinNodeRec.RecordType = "locatn_view"
        locBinNodeRec.SetField "loc_objid",
CLng(tvwCountLoc.Key(nodeID))
        Cobj_recSelectLocBinNode.Fill locBinNodeRec
        Call ProperEnabling
End Sub
' -----------------------------
' Click Remove button
' -----------------------------
Sub btnRemove_Click( )
        Dim newChildRec         As New Record
        Dim locationBulkR       As New BulkRetrieve
        Dim rollupRec           As Record
        Dim nodeLocationRec     As Record
        newChildRec.RecordType = "inv_locatn"
        Set rollupRec = Cobj_recLocRollup.Contents
        If rollupRec.GetField("use_type") = 0 Then 'CC count point
            If lcbActiveCCExists(rollupRec, "rollup2cycle_count") Then
                App.MsgBox LCB_CC_ROLLUP_ERR2
                Exit Sub
            End If
        End If
        Set nodeLocationRec = Cobj_recSelectLocBinNode.Contents
        newChildRec.SetField "objid",
nodeLocationRec.GetField("loc_objid")
        nodeKeyRemoved = nodeLocationRec.GetField("loc_objid")
        ' delete all children role from the parent
        Call lcb_Delete_obj_rol_itm ( newChildRec, rollupRec )
        tvwCountLoc.Clear
        Call lcbGetRollup ( )
        Call ProperEnabling
End Sub
' -----------------------------
' Click ADD rollup button
' -----------------------------
Sub btnAdd_Click( )
        Dim le As LEType
        Call FillLE(le)
        Call LEListAdd( le )
        Call ProperEnabling
End Sub
' -----------------------------
' Click SAVE rollup button
' -----------------------------
Sub btnReplace_Click( )
        Dim le As LEType
        Call FillLE(le)
        Call LEListReplace( le )
        Call ProperEnabling
End Sub
' -----------------------------
' Click REMOVE rollup button
' -----------------------------
Sub btnRemoveRollup_Click( )
        Dim locationBulkR       As New BulkRetrieve
        Dim rollupRec           As Record
        Dim MyBulkSav           As New BulkSave
        Dim rollupList          As List
        Dim rollupItmRec        As Record
```

-continued

```
    Dim index            As Long
    Dim dbString         As String
    Dim le As LEType
    Call FillLE(le)
    Set rollupRec = Cobj_recLocRollup.Contents
    If rollupRec.GetField("use_type") = 0 Then 'CC count point
        If lcbCCExists(rollupRec, "rollup2cycle_count") Then
            App.MsgBox LCB_CC_ROLLUP_ERR1
            Exit Sub
        End If
    End If
    locationBulkR.SetRoot rollupRec
    locationBulkR.TraverseFromRoot 0, "rollup2loc_rol_itm"
    locationBulkR.RetrieveRecords
    Set rollupList = locationBulkR.GetRecordList(0)
    If rollupList.Count > 0 Then
        If App.MsgBox( LCB_ROLLUP_DELETE_VALID_MSG, cbYesNo,
LE_CONFIRM_DELETE_DLG_TITLE ) = cbidNo Then
            Exit Sub
        End If
    End If
    ' Actually delete it
    If rollupList.Count > 0 Then
        For index = 0 To rollupList.Count - 1
            Set rollupItmRec = rollupList.ItemByIndex(index)
            MyBulkSav.DeleteRecord rollupItmRec
        Next index
    End If
    MyBulkSav.DeleteRecord rollupRec
    MyBulkSav.Save
    ' Tell any parent screen to delete the row
    If LEIsAChild( le ) Then
        le.frm.NotifyParent msgLEListDelete
    Else
        Call LEEditNew( le )
    End If
    ' No need to save changes now
    Call LEClearDirty ( le )
    ' Remove the deleted item from the grid
    clbCbxLocRollups.RemoveSelected
    clbCbxLocRollups.Unselect
    tvwCountLoc.Clear
    Call ClearRelatedCountLoc
    Call ClearCobj( Cobj_recSelectLocBinNode, "locatn_view" )
    Call ProperEnabling
End Sub
Sub SaveOther( le As LEType )
    If ZeroObjid( Cobj_recLocRollup.Contents ) Then
        grec_le.SetField "rollup_type", 1
        grec_le.SetField "focus_type", 228
    End If
End Sub
' ----------------------------------------------------------------------
' Add As Parent button is clicked
' ----------------------------------------------------------------------
Sub btnAddParent_Click( )
    Dim parentRec As Record
    Dim rollupRec As Record
    Set parentRec = Cobj_recLocatnView.Contents
    Set rollupRec = Cobj_recLocRollup.Contents
    If rollupRec.GetField("use_type") = 0 Then 'CC count point
        If lcbActiveCCExists(rollupRec, "rollup2cycle_count") Then
            App.MsgBox LCB_CC_ROLLUP_ERR2
            Exit Sub
        End If
    End If
    If rollupRec.GetField("use_type") = 0 Then
        Dim parentLocRec As New Record
        Set parentLocRec.RecordType = "inv_locatn"
        parentLocRec.SetField "objid",
parentRec.GetField("loc_objid")
        Call lcb_ValidateParent ( parentRec, rollupRec,
parentLocRec )
        If lcb_InOtherInventoryRollup (parentLocRec, rollupRec)
Then
            Exit Sub
        End If
    End If
    nodX = tvwCountLoc.Add( ,
```

-continued

```
,CStr(parentRec.GetField("loc_objid"))
,parentRec.GetField("location_name") ,imageVal,
selectedImageVal)
      If parentRec.GetField("active") = 0 Then
            tvwCountLoc.SetItemOverlayImage nodX,1
      End If
      Dim BulkS As New BulkSave
      Dim newRoleRec As New Record
      newRoleRec.RecordType = "loc_rol_itm"
      newRoleRec.SetField "path_type", 0
      newRoleRec.SetField "depth", 0
      BulkS.InsertRecord newRoleRec
      BulkS.RelateRecordsToID newRoleRec, "inv_locatn",
parentRec.GetField("loc_objid"), "parent2inv_locatn"
      BulkS.RelateRecordsToID newRoleRec, "inv_locatn",
parentRec.GetField("loc_objid"), "child2inv_locatn"
      BulkS.RelateRecords newRoleRec, rollupRec,
"loc_itm2rollup"
      BulkS.Save
      Dim locBinNodeRec as New Record
      Set locBinNodeRec.RecordType = "locatn_view"
      Set locBinNodeRec = parentRec.Copy
      Cobj_recSelectLocBinNode.Fill locBinNodeRec
'need a method to set selected node!!!!
      tvwCountLoc.SetSelectedItem
CStr(parentRec.GetField("loc_objid"))
      Call ProperEnabling
End Sub
'------------------------------------------------------------------------------------------------------
' Add As Sibling button is clicked
'------------------------------------------------------------------------------------------------------
Sub btnAddSibling_Click( )
'Get the selected node record from database and the Selected
Build Hierarchy location(s)
      Dim nodeLocationRec          as Record
      Dim locBuildList             as List
      Dim locBuildObjidList        as New List
      Dim nodeLocList              as List
      Dim nodeLocRec               as Record
      Dim rollupRec                as Record
      Dim locBuildRec              as Record
      Dim locIndex                 as Long
      Dim locationBulkR            as New BulkRetrieve
      Dim parentDepth              As Long
      Dim nodeRolList              As List
      Dim nodeRolRec               As Record
      Dim parentOfNodeLocRec       As New Record
      Set nodeLocationRec = Cobj_recSelectLocBinNode.Contents
      Set rollupRec = Cobj_recLocRollup.Contents
      If rollupRec.GetField("use_type") = 0 Then 'CC count point
            If lcbActiveCCExists(rollupRec, "rollup2cycle_count") Then
                  App.MsgBox LCB_CC_ROLLUP_ERR2
                  Exit Sub
            End If
      End If
      locBuildObjidList.ItemType = "long"
      Set locBuildList = clbCbxCountLocs.SelectedList
      locBuildList.ExtractList locBuildObjidList, "loc_objid"
      locationBulkR.SimpleQuery 0, "inv_locatn"
      locationBulkR.AppendFilter 0, "objid", cbEqual,
nodeLocationRec.GetField("loc_objid")
      locationBulkR.SimpleQuery 1, "inv_locatn"
      locationBulkR.AppendFilter 1, "objid", cbIn,
locBuildObjidList
      locationBulkR.SimpleQuery 2, "loc_rollup_v"
      locationBulkR.AppendFilter 2, "child_objid", cbEqual,
nodeLocationRec.GetField("loc_objid")
      locationBulkR.AppendFilter 2, "path_type", cbEqual, 0
      locationBulkR.AppendFilter 2, "rollup_objid", cbEqual,
rollupRec.GetField( "objid" )
      locationBulkR.RetrieveRecords
      Set nodeLocList = locationBulkR.GetRecordList(0)
      Set locBuildList = locationBulkR.GetRecordList(1)
      Set nodeRolList = locationBulkR.GetRecordList(2)
      'If nodeRolList.Count = 1 Then
'            Set nodeRolRec = nodeRolList.ItemByIndex(0)
'            If nodeRolRec.GetField("depth") > 0 Then
'                  parentDepth = nodeRolRec.GetField("depth") – 1
'            Else
```

-continued

```
'          App.MsgBox LCB_PARENT_ERR_BUILD_HIER
'          Exit Sub
'       End If
'   Else
'       App.MsgBox LCB_PARENT_ERR_BUILD_HIER
'       Exit Sub
'   End If
    If nodeRolList.Count > 0 Then
        Set nodeRolRec = nodeRolList.ItemByIndex(0)
        If nodeRolRec.GetField("depth") > 0 Then
            parentDepth = nodeRolRec.GetField("depth") - 1
        Else
            App.MsgBox LCB_PARENT_ERR_BUILD_HIER
            Exit Sub
        End If
    Else
        App.MsgBox LCB_PARENT_ERR_BUILD_HIER
        Exit Sub
    End If
'Update the new child to have the same parent as selected node
    If nodeLocList.Count = 1 Then
        Set nodeLocRec = nodeLocList.ItemByIndex(0)
        Set parentOfNodeLocRec.RecordType = "inv_locatn"
        parentOfNodeLocRec.SetField "objid",
nodeRolRec.GetField("parent_objid")
        For locIndex = 0 to locBuildList.Count - 1
            Set locBuildRec = locBuildList.ItemByIndex(locIndex)
            ' check if meet all other conditions
            If lcb_MeetAllRollupConditions ( "loc_rollup_v",
parentOfNodeLocRec, locBuildRec, rollupRec ) Then
                ' Create a direct child loc_rol_itm and copy all
children as indirect children to the parents
                Call lcb_AddRolItm ( parentOfNodeLocRec,
locBuildRec, rollupRec, parentDepth )
                nodX =
tvwCountLoc.Add(CStr(nodeRolRec.GetField("parent_objid")),tvwChi
ld, CStr(locBuildRec.GetField("objid")),
locBuildRec.GetField("location_name"),imageVal,selectedImageVal)
                If locBuildRec.GetField("active") = 0 Then
                    tvwCountLoc.SetItemOverlayImage nodX,1
                End If
            End If
        Next locIndex
        Call ProperEnabling
    End If
End Sub
' ---------------------------------------------------------------------------------------------------------
' Add As Child button is clicked
' ---------------------------------------------------------------------------------------------------------
Sub btnAddChild_Click( )
'Get the selected node record from database and the Selected
Build Hierarchy location(s)
    Dim nodeLocationRec    as Record
    Dim locBuildList       as List
    Dim locBuildObjidList  as New List
    Dim nodeLocList        as List
    Dim nodeLocRec         as Record
    Dim rollupRec          as Record
    Dim locBuildRec        as Record
    Dim locIndex           as Long
    Dim locationBulkR      as New BulkRetrieve
    Dim parentDepth        As Long
    Dim nodeRolList        As List
    Dim nodeRolRec         As Record
    Set nodeLocationRec = Cobj_recSelectLocBinNode.Contents
    Set rollupRec = Cobj_recLocRollup.Contents
    If rollupRec.GetField("use_type") = 0 Then 'CC count point
        If lcbActiveCCExists(rollupRec, "rollup2cycle_count") Then
            App.MsgBox LCB_CC_ROLLUP_ERR2
            Exit Sub
        End If
    End If
    locBuildObjidList.ItemType = "long"
    Set locBuildList = clbCbxCountLocs.SelectedList
    locBuildList.ExtractList locBuildObjidList, "loc_objid"
    locationBulkR.SimpleQuery 0, "inv_locatn"
    locationBulkR.AppendFilter 0, "objid", cbEqual,
nodeLocationRec.GetField("loc_objid")
    locationBulkR.SimpleQuery 1, "inv_locatn"
```

-continued

```
    locationBulkR.AppendFilter 1, "objid", cbIn,
locBuildObjidList
    locationBulkR.SimpleQuery 2, "loc_rollup_v"
    locationBulkR.AppendFilter 2, "child_objid", cbEqual,
nodeLocationRec.GetField("loc_objid")
    locationBulkR.AppendFilter 2, "path_type", cbEqual, 0
    locationBulkR.AppendFilter 2, "rollup_objid", cbEqual,
rollupRec.GetField( "objid" )
    locationBulkR.RetrieveRecords
    Set nodeLocList = locationBulkR.GetRecordList(0)
    Set locBuildList = locationBulkR.GetRecordList(1)
    Set nodeRolList = locationBulkR.GetRecordList(2)
    If nodeRolList.Count = 1 Then
        Set nodeRolRec = nodeRolList.ItemByIndex(0)
        parentDepth = nodeRolRec.GetField("depth")
    Else
        parentDepth = 0
    End If
'Update the child to have the same parent
    If nodeLocList.Count = 1 Then
        Set nodeLocRec = nodeLocList.ItemByIndex(0)
        For locIndex = 0 to locBuildList.Count - 1
            Set locBuildRec = locBuildList.ItemByIndex(locIndex)
                ' check if meet all other conditions
            If lcb_MeetAllRollupConditions ( "loc_rollup_v",
nodeLocRec, locBuildRec, rollupRec ) Then
                ' Create a direct child loc_rol_itm and copy all
children as indirect children to the parents
                Call lcb_AddRolItm ( nodeLocRec, locBuildRec,
rollupRec, parentDepth )
                nodX =
tvwCountLoc.Add(CStr(nodeLocRec.GetField("objid")),tvwChild,
CStr(locBuildRec.GetField("objid")),
locBuildRec.GetField("location_name"),imageVal,selectedImageVal)
                If locBuildRec.GetField("active") = 0 Then
                    tvwCountLoc.SetItemOverlayImage nodX,1
                End If
            End If
        Next locIndex
        Call ProperEnabling
    End If
End Sub
' ----------------------------------------------------------------
' New button is clicked — Clear button
' ----------------------------------------------------------------
Sub btnNew_Click( )
    tvwCountLoc.Clear
    Call ClearRelatedCountLoc
    Call ClearRelatedRollup
    Call ClearCobj( Cobj_recSelectLocBinNode, "locatn_view" )
    Call ProperEnabling
End Sub
Sub btnUseDone_Click( )
    Set grec_le = Cobj_recLocRollup.Contents
    Me.NotifyParent msgLEListMoveRecord, "rollup"
    Me.Close
End Sub
' ----------------------------------------------------------------
' Show a single related record
' ----------------------------------------------------------------
Sub MoveRecord( MessageStr As String )
End Sub
' ----------------------------------------------------------------
' Message handler
' ----------------------------------------------------------------
Sub Message (ByVal MessageNum as Long, ByVal MessageStr as
String)
    Dim le As LEType
    Call FillLE(le)
    Select Case MessageNum
        Case msgLEListCheckRequired
            Call CheckRequired
        Case msgLEEditMakeChild
            Call LESetIsAChild( le, True )
        Case msgLEListSaveOther
            Call SaveOther ( le )
        Case msgLEListPreFilter
            Select Case MessageStr
                Case "rollup"
```

```
                    CBX_SelectLocRollup.ClearPreFilter "objid", ""
                    CBX_SelectLocRollup.AppendPreFilter
"","objid","is equal to",grec_le.GetField("objid")
                    btnCbxfRollup.Enabled = TRUE
                    btnCbxfRollup.Value = 1
                    'Me.EnableControls "btnUseDone"
                    'btnUseDone.Default = TRUE
                    CBX_SelectLocRollup.SetSelectedById
grec_le.GetField("objid")
                    Dim locRollupRec As New Record
                    If
CBX_SelectLocRollup.GetSelected(locRollupRec) Then
                        Cobj_recLocRollup.Fill locRollupRec
                        tvwCountLoc.Clear
                        Call ClearRelatedCountLoc
                        Call ClearCobj( Cobj_recSelectLocBinNode,
"locatn_view" )
                        Call lcbGetRollup ( )
                        Call ProperEnabling
                    End If
                Case "inv_locatn"
                    Dim recInvLocatn as Record
                    Set recInvLocatn = grec_le
                    If recInvLocatn.GetField("location_name") <>
"" Then
                        CBX_SelectLocRollup.ClearPreFilter "",
"rollup2loc_rol_itm:child2inv_locatn:location_name"
                        CBX_SelectLocRollup.AppendPreFilter "",
"rollup2loc_rol_itm:child2inv_locatn:location_name","is equal
to", recInvLocatn.GetField("location_name")
                    End If
                    btnCbxfRollup.Value = 1
                    Me.EnableControls "btnUseDone"
                    btnUseDone.Default = TRUE
                Case "cycle_setup"
                    Dim recCCRollup as Record
                    Set recCCRollup = grec_le
                    CBX_SelectLocRollup.ClearPreFilter
"usage_type", ""
                    CBX_SelectLocRollup.AppendPreFilter
"usage_type", "use_type", "is equal to", 0
                    If recCCRollup.GetField("name") <> "" Then
                        CBX_SelectLocRollup.EnableAdhoc TRUE, TRUE
                        CBX_SelectLocRollup.SetAdhocCellText
"name",recCCRollup.GetField("name")
                    End If
                    btnCbxfRollup.Value = 1
                    Me.EnableControls "btnUseDone"
                    btnUseDone.Default = TRUE
                Case "count_setup"
                    CBX_SelectLocRollup.ClearPreFilter
"usage_type", ""
                    CBX_SelectLocRollup.AppendPreFilter
"usage_type", "use_type", "is equal to", 0
                    btnCbxfRollup.Value = 1
                    Me.EnableControls "btnUseDone"
                    btnUseDone.Default = TRUE
            End Select
        Case msgLEEditMoveRecord
            Call MoveRecord( MessageStr )
        Case Else
            If Not LEListMsgHandler( MessageNum, MessageStr, le )
Then Call ASSERT( False, BadMsgMsg( Me.ID, MessageNum ) )
    End Select
End Sub
' **********************
' Functions and Routines
' **********************
' ---------------------------------------------------------------------------
' Display the location hierarchy for the selected rollup
' ---------------------------------------------------------------------------
Sub lcbGetRollup( )
    Dim BulkR              As New BulkRetrieve
    Dim rollupLocList      As List
    Dim childLocRec        As Record
    Dim childLocationIndex As Long
    Dim locBinNodeRec      as New Record
    Set locBinNodeRec.RecordType = "locatn_view"
    BulkR.SimpleQuery 0, "loc_rollup_v"
```

-continued

```
        BulkR.AppendFilter 0, "rollup_objid", cbEqual, CGetField (
Cobj_recLocRollup, "objid" )
        BulkR.AppendFilter 0, "path_type", cbEqual, 0
        BulkR.AppendSort 0, "depth", cbAscending
        BulkR.RetrieveRecords
        Set rollupLocList = BulkR.GetRecordList(0)
        If rollupLocList.Count > 0 Then
            For childLocationIndex = 0 to rollupLoclist.Count - 1
                Set childLocRec =
rollupLoclist.ItemByIndex(childLocationIndex)
                If childLocationIndex = 0 Then
                    nodX = tvwCountLoc.Add( ,
,CStr(childLocRec.GetField("parent_objid"))
,childLocRec.GetField("parent_name") ,imageVal,
selectedImageVal)
                    If childLocRec.GetField("parent_active") = 0 Then
                        tvwCountLoc.SetItemOverlayImage nodX,1
                    End If
                    'Set the parent node as the selected node. Need this
to enable/disable controls.
                    locBinNodeRec.SetField "loc_objid",
childLocRec.GetField("parent_objid")
                    Cobj_recSelectLocBinNode.Fill locBinNodeRec
                    'set selected node
                    tvwCountLoc.SetSelectedItem
CStr(childLocRec.GetField("parent_objid"))
                Else
                    nodX =
tvwCountLoc.Add(CStr(childLocRec.GetField("parent_objid")),tvwCh
ild, CStr(childLocRec.GetField("child_objid")),
childLocRec.GetField("child_name"),imageVal,selectedImageVal)
                    If childLocRec.GetField("child_active") = 0 Then
                        tvwCountLoc.SetItemOverlayImage nodX,1
                    End If
                    If childLocRec.GetField("depth") <= nodeDepthRemoved
Then
                        tvwCountLoc.Expand
CStr(childLocRec.GetField("parent_objid")), 2
                    End If
                End If
            Next
        Else
            Cobj_recSelectLocBinNode.Fill locBinNodeRec
        End If
        nodeKeyRemoved = 0
        nodeDepthRemoved = 0
End Sub
Sub lcb_Delete_obj_rol_itm ( newChildRec As Record, rollupRec As
Record)
        Dim MyBulkR              As New BulkRetrieve
        Dim MyBulkSav            As New BulkSave
        Dim nodeCList            As List
        Dim rolItmObjidList      As New List
        Dim childLocObjidList    As New List
        Dim rolItemRec           As Record
        Dim deleteList           As List
        Dim index                As Long
        childLocObjidList.ItemType = "long"
        childLocObjidList.AllowDuplicates = FALSE
'Get the selected nodes children
        MyBulkR.SimpleQuery   0, "loc_rollup_v"
        MyBulkR.AppendFilter  0, "parent_objid", cbEqual,
newChildRec.GetField( "objid" )
        MyBulkR.AppendFilter 0, "rollup_objid", cbEqual,
rollupRec.GetField( "objid" )
        MyBulkR.RetrieveRecords
        Set nodeCList = MyBulkR.GetRecordList(0)
        If nodeCList.Count > 0 Then
            nodeCList.ExtractList childLocObjidList, "child_objid"
        End If
'Include the selected node in the list to delete
        childLocObjidList.AppendItem newChildRec.GetField( "objid" )
'Now retrieve the children's children
        MyBulkR.SimpleQuery   0, "loc_rollup_v"
        MyBulkR.AppendFilter  0, "child_objid", cbIn,
childLocObjidList
        MyBulkR.AppendFilter  0, "rollup_objid", cbEqual,
rollupRec.GetField( "objid" )
        MyBulkR.RetrieveRecords
```

-continued

```
            Set deleteList = MyBulkR.GetRecordList(0)
            If deleteList.Count > 0 Then
                rolItmObjidList.ItemType = "long"
                deleteList.ExtractList rolItmObjidList, "objid"
                'Get the removed node record to get its depth so that the Tree can be
                'Expanded out to this depth when it is refreshed
                Dim removedNodeLocRec        as Record
                For index = 0 to deleteList.Count - 1
                    Set removedNodeLocRec = deleteList.ItemByIndex(index)
                    If CLng(removedNodeLocRec.GetField("child_objid")) = nodeKeyRemoved AND CLng(removedNodeLocRec.GetField("path_type")) = 0 Then
                        nodeDepthRemoved = CLng(removedNodeLocRec.GetField("depth"))
                        Exit For
                    End If
                Next
                MyBulkR.SetRoot rollupRec
                MyBulkR.TraverseFromRoot 0, "rollup2loc_rol_itm"
                MyBulkR.AppendFilter 0, "objid", cbIn, rolItmObjidList
                MyBulkR.RetrieveRecords
                Set deleteList = MyBulkR.GetRecordList(0)
                For index = 0 to deleteList.Count - 1
                    Set rolItemRec = deleteList.ItemByIndex(index)
                    MyBulkSav.DeleteRecord rolItemRec
                Next index
                MyBulkSav.Save
            End If
End Sub
Function lcb_IsItself ( newParentRec As Record, newChildRec As Record ) As Boolean
    Dim dbString                As String
    lcb_IsItself = False
    If newChildRec.GetField("objid") = newParentRec.GetField("objid") Then
        Set LCB_IN_SAME_ROLLUP_ERR = New GlobalString
        If App.GetString(LCB_STR_SAME_ROLLUP_ERR, dbString, newChildRec.GetField("location_name")) Then
            LCB_IN_SAME_ROLLUP_ERR.SetValue dbString
        Else
            dbString = newChildRec.GetField("location_name") & " is already in this location rollup, please select another location."
            LCB_IN_SAME_ROLLUP_ERR.SetValue dbString
        End If
        App.Msgbox LCB_IN_SAME_ROLLUP_ERR
        lcb_IsItself = True
    End If
End Function
Function lcb_IsChild ( pList As List, newChildRec As Record ) As Boolean
    Dim ind As Integer, MyList As List, dbString As String
    lcb_IsChild = False
    ind = pList.FindFirstIndex( newChildRec.GetField("objid"), "child_objid" )
    If Not ind = -1 Then
        Set LCB_CHILD_ROLLUP_ERR = New GlobalString
        If App.GetString(LCB_STR_CHILD_ROLLUP_ERR, dbString, newChildRec.GetField("location_name")) Then
            LCB_CHILD_ROLLUP_ERR.SetValue dbString
        Else
            dbString = newChildRec.GetField("location_name") + " is already a direct or indirect child location, please select others. "
            LCB_CHILD_ROLLUP_ERR.SetValue dbString
        End If
        App.Msgbox LCB_CHILD_ROLLUP_ERR
        lcb_IsChild = True
        Exit Function
    End If
End Function
Function lcb_IsParent ( pList As List, newParentRec As Record ) As Boolean
    Dim ind As Integer, MyList As List, message As String
    Dim dbString                As String
    lcb_IsParent = False
    ind = pList.FindFirstIndex( newParentRec.GetField("objid"),
```

-continued

```
"parent_objid" )
    If Not ind = -1 Then
        Set LCB_PARENT_ROLLUP_ERR = New GlobalString
        If App.GetString(LCB_STR_PAR_ROLLUP_ERR, dbString,
newParentRec.GetField("location_name")) Then
            LCB_PARENT_ROLLUP_ERR.SetValue dbString
        Else
            dbString = newParentRec.GetField("location_name") + "
is already a direct or indirect parent location, please select
others. "
            LCB_PARENT_ROLLUP_ERR.SetValue dbString
        End If
        App.Msgbox LCB_PARENT_ROLLUP_ERR
        lcb_IsParent = True
        Exit Function
    End If
End Function
Function lcb_IsSomeWhereInRollup ( newChildRec As Record ) As
Boolean
    Dim dbString            As String
    Dim ind                 As Long
    lcb_IsSomeWhereInRollup = False
    ind = -1
    ind = invRollupList.FindFirstIndex(
newChildRec.GetField("objid"), "child_objid" )
    If ind > -1 Then
        Set LCB_IN_SAME_ROLLUP_ERR = New GlobalString
        If App.GetString(LCB_STR_SAME_ROLLUP_ERR, dbString,
newChildRec.GetField("location_name")) Then
            LCB_IN_SAME_ROLLUP_ERR.SetValue dbString
        Else
            dbString = newChildRec.GetField("location_name") & "
is already in this location rollup, please select another
location."
            LCB_IN_SAME_ROLLUP_ERR.SetValue dbString
        End If
        App.Msgbox LCB_IN_SAME_ROLLUP_ERR
        lcb_IsSomeWhereInRollup = True
    End If
End Function
Function lcb_InOtherInventoryRollup (newChildRec As Record,
rollupRec As Record) As Boolean
    Dim dbString            As String
    Dim ind                 As Long
    Dim rollupItemRec       As Record
    lcb_InOtherInventoryRollup = False
    ind = -1
    ind = otherInvRollupParentList.FindFirstIndex(
newChildRec.GetField("objid"), "parent_objid" )
    If ind > -1 Then
        Set rollupItemRec =
otherInvRollupParentList.ItemByIndex(ind)
        Set LCB_INV_TYPE_ROLLUP_ERR = New GlobalString
        If App.GetString(LCB_STR_INV_ROLLUP_ERR, dbString,
newChildRec.GetField("location_name")) Then
            LCB_INV_TYPE_ROLLUP_ERR.SetValue dbString
        Else
            dbString = newChildRec.GetField("location_name") & "
is already in Inventory Rollup " &
rollupItemRec.GetField("rollup_name")
            LCB_INV_TYPE_ROLLUP_ERR.SetValue dbString
        End If
        App.Msgbox LCB_INV_TYPE_ROLLUP_ERR
        lcb_InOtherInventoryRollup = True
        Exit Function
    End If
    ind = -1
    ind = otherInvRollupChildList.FindFirstIndex(
newChildRec.GetField("objid"), "child_objid" )
    If ind > -1 Then
        Set rollupItemRec =
otherInvRollupChildList.ItemByIndex(ind)
        Set LCB_INV_TYPE_ROLLUP_ERR = New GlobalString
        If App.GetString(LCB_STR_INV_ROLLUP_ERR, dbString,
newChildRec.GetField("location_name")) Then
            LCB_INV_TYPE_ROLLUP_ERR.SetValue dbString
        Else
            dbString = newChildRec.GetField("location_name") & "
is already in Inventory Rollup " &
```

-continued

```
rollupItemRec.GetField("rollup_name")
            LCB_INV_TYPE_ROLLUP_ERR.SetValue dbString
        End If
        App.Msgbox LCB_INV_TYPE_ROLLUP_ERR
        lcb_InOtherInventoryRollup = True
    End If
End Function
Sub lcb_AddRolItm ( newParentRec As Record, newChildRec As
Record, rollupRec As Record, parentDepth as Long )
    Dim BulkS As New BulkSave, i As Integer, j As Integer,
currParent As Record, currChild As Record, pObjid As Long,
cObjid As Long
    For i = 0 To gparentPList.Count
        If i = gparentPList.Count Then
            pObjid = newParentRec.GetField ( "objid" )
        Else
            Set currParent = gparentPList.ItemByIndex (i)
            pObjid = currParent.GetField ( "parent_objid" )
        End If
        For j = 0 To gchildCList.Count
            If j = gchildCList.Count Then
                cObjid = newChildRec.GetField ( "objid" )
            Else
                Set currChild = gchildCList.ItemByIndex (j)
                cObjid = currChild.GetField ( "child_objid" )
            End If
            Dim newRoleRec As New Record
            newRoleRec.RecordType = "loc_rol_itm"
            If i = gparentPList.Count And j = gchildCList.Count
Then
                newRoleRec.SetField "path_type", 0
                newRoleRec.SetField "depth", parentDepth + 1
            Else
                newRoleRec.SetField "path_type", 1
            End If
            BulkS.InsertRecord newRoleRec
            BulkS.RelateRecordsToID    newRoleRec, "inv_locatn",
pObjid, "parent2inv_locatn"
            BulkS.RelateRecordsToID    newRoleRec, "inv_locatn",
cObjid, "child2inv_locatn"
            BulkS.RelateRecords        newRoleRec, rollupRec,
"loc_itm2rollup"
        Next j
    Next i
    BulkS.Save
End Sub
Sub lcb_ValidateParent ( currParent As Record, rollupRec As
Record, currParentLocRec As Record )
    Dim MyBulkR                As New BulkRetrieve
    Dim currParentlocList      As List
    Set otherInvRollupParentList = New List
    Set otherInvRollupChildList = New List
    otherInvRollupParentList.ItemType = "record"
    otherInvRollupChildList.ItemType = "record"
    MyBulkR.SimpleQuery    0, "loc_rollup_v"
    MyBulkR.AppendFilter   0, "child_objid", cbEqual,
currParent.GetField("loc_objid")
    MyBulkR.AppendFilter   0, "usage_type", cbEqual, 0
    MyBulkR.AppendFilter   0, "path_type", cbEqual, 0
    MyBulkR.AppendFilter   0, "rollup_objid", cbNotEqual,
rollupRec.GetField("objid")
    MyBulkR.SimpleQuery    1, "loc_rollup_v"
    MyBulkR.AppendFilter   1, "parent_objid", cbEqual,
currParent.GetField("loc_objid")
    MyBulkR.AppendFilter   1, "usage_type", cbEqual, 0
    MyBulkR.AppendFilter   1, "path_type", cbEqual, 0
    MyBulkR.AppendFilter   1, "rollup_objid", cbNotEqual,
rollupRec.GetField("objid")
    MyBulkR.SimpleQuery    2, "inv_locatn"
    MyBulkR.AppendFilter   2, "objid", cbEqual,
currParent.GetField("loc_objid")
    MyBulkR.RetrieveRecords
    Set otherInvRollupChildList = MyBulkR.GetRecordList(0)
    Set otherInvRollupParentList = MyBulkR.GetRecordList(1)
    Set currParentLocList = MyBulkR.GetRecordList(2)
    If currParentLocList.Count = 1 Then
        Set currParentLocRec = currParentLocList.ItemByIndex(0)
    End If
End Sub
```

-continued

```
Sub lcb_GetDataToValidateAdd ( viewName As String, currParent As
Record, currChild As Record, rollupRec As Record )
    Dim mychildCList As New List, mychildPList As New List,
myparentCList As New List, myparentPList As New List
    Dim rollup_objid As Long, rollup_type As Long
    Dim MyBulkR As New BulkRetrieve
    Set invRollupList = New List
    invRollupList.ItemType = "record"
    Set otherInvRollupParentList = New List
    Set otherInvRollupChildList = New List
    otherInvRollupParentList.ItemType = "record"
    otherInvRollupChildList.ItemType = "record"
    mychildCList.ItemType = "record"
    mychildPList.ItemType = "record"
    myparentCList.ItemType = "record"
    myparentPList.ItemType = "record"
    Set gchildCList = mychildCList
    Set gchildPList = mychildPList
    Set gparentCList = myparentCList
    Set gparentPList = myparentPList
    MyBulkR.SimpleQuery    0, "loc_rollup_v"
    MyBulkR.AppendFilter   0, "parent_objid", cbEqual,
currChild.GetField( "objid" )
    MyBulk.AppendFilter    0, "rollup_objid", cbEqual,
rollupRec.GetField( "objid" )
    MyBulkR.SimpleQuery    1, "loc_rollup_v"
    MyBulkR.AppendFilter   1, "child_objid", cbEqual,
currChild.GetField( "objid" )
    MyBulkR.AppendFilter   1, "rollup_objid", cbEqual,
rollupRec.GetField( "objid" )
    MyBulkR.SimpleQuery    2, "loc_rollup_v"
    MyBulkR.AppendFilter   2, "parent_objid", cbEqual,
currParent.GetField("objid")
    MyBulkR.AppendFilter   2, "rollup_objid", cbEqual,
rollupRec.GetField("objid")
    MyBulkR.SimpleQuery    3, "loc_rollup_v"
    MyBulkR.AppendFilter   3, "child_objid", cbEqual,
currParent.GetField("objid")
    MyBulkR.AppendFilter   3, "rollup_objid", cbEqual,
rollupRec.GetField("objid")
    MyBulkR.AppendFilter   3, "depth", cbNotEqual, 0
    MyBulkR.SimpleQuery    4, "loc_rollup_v"
    MyBulkR.AppendFilter   4, "child_objid", cbEqual,
currChild.GetField("objid")
    MyBulkR.AppendFilter   4, "rollup_objid", cbEqual,
rollupRec.GetField("objid")
    MyBulkR.AppendFilter   4, "path_type", cbEqual, 0
    MyBulkR.SimpleQuery    5, "loc_rollup_v"
    MyBulkR.AppendFilter   5, "child_objid", cbEqual,
currChild.GetField("objid")
    MyBulkR.AppendFilter   5, "usage_type", cbEqual, 0
    MyBulkR.AppendFilter   5, "path_type", cbEqual, 0
    MyBulkR.AppendFilter   5, "rollup_objid", cbNotEqual,
rollupRec.GetField("objid")
    MyBulkR.SimpleQuery    6, "loc_rollup_v"
    MyBulkR.AppendFilter   6, "parent_objid", cbEqual,
currChild.GetField("objid")
    MyBulkR.AppendFilter   6, "usage_type", cbEqual, 0
    MyBulkR.AppendFilter   6, "path_type", cbEqual, 0
    MyBulkR.AppendFilter   6, "rollup_objid", cbNotEqual,
rollupRec.GetField("objid")
    MyBulkR.RetrieveRecords
    Set mychildCList = MyBulkR.GetRecordList(0)
    If mychildCList.Count > 0 Then Set gchildCList = mychildCList
    Set mychildPList = MyBulkR.GetRecordList(1)
    If mychildPList.Count > 0 Then Set gchildPList = mychildPList
    Set myparentCList = MyBulkR.GetRecordList(2)
    If myparentCList.Count > 0 Then Set gparentCList =
myparentCList
    Set myparentPList = MyBulkR.GetRecordList(3)
    If myparentPList.Count > 0 Then Set gparentPList =
myparentPList
    Set invRollupList = MyBulkR.GetRecordList(4)
    Set otherInvRollupChildList = MyBulkR.GetRecordList(5)
    Set otherInvRollupParentList = MyBulkR.GetRecordList(6)
End Sub
Function lcb_MeetAllRollupConditions ( rollupView As String,
newParentRec As Record, newChildRec As Record, rollupRec As
Record ) As Boolean
```

-continued

```
    lcb_MeetAllRollupConditions = False
    If lcb_IsItself ( newParentRec, newChildRec) Then Exit
Function
    Call lcb_GetDataToValidateAdd ( rollupView, newParentRec,
newChildRec, rollupRec )
    If rollupRec.GetField("use_type") = 0 Then
        If lcb_InOtherInventoryRollup (newChildRec, rollupRec)
Then
            Exit Function
        End If
    End If
    If lcb_IsChild ( gparentCList, newChildRec) Then Exit
Function 'is it a child of node
    If lcb_IsParent ( gparentPList, newChildRec) Then Exit
Function 'is it a child of node's parent(grandparents)
'If we made it this far, then we know the new Child location is
not a direct or indirect link in either the focus location's
'child list or parent list. We also no it's not in some other
Inventory Rollup.
'Need to check if this new child location exists in some other
branch
'of this rollup hierarchy now.
    If lcb_IsSomeWhereInRollup ( newChildRec ) Then Exit Function
    lcb_MeetAllRollupConditions = True
End Function
```

What is claimed is:

1. A method of creating a relational data structure for storage in a computer readable medium, and retrieval of data having multiple simultaneous hierarchical database relationships without needing dedicated database relationships between objects in the multiple simultaneous hierarchies, the method comprising:

forming a table of members referenced in the multiple simultaneous hierarchical database relationships and data to be accessed wherein the data is associated with each member;

forming a table of reporting relationships among the members referenced in the multiple simultaneous hierarchical database relationships, wherein each one of said reporting relationships is associated with a hierarchy identifier; and forming a table of summary description of each one of the multiple simultaneous hierarchies existing in the table of reporting relationships, the table of summary description having a first record representing a first one of the multiple simultaneous hierarchical database relationships and a second record representing a second one of the multiple simultaneous hierarchical database relationships;

in the table of reporting relationships, designating a first relationship between a first member and a second member associated with the first one of the multiple simultaneous hierarchies;

in the table of reporting relationships, designating a second relationship between the first member and the second member associated with the second one of the multiple simultaneous hierarchies; and in the table of reporting relationships, designating a reversible parent☐child relationship between pairs of the members, wherein a first member is denoted as a parent to a second member, and the second member is denoted as a parent to the first member.

2. A relational data structure tangibly embodied in a computer-readable medium for representing multiple simultaneous hierarchies without needing dedicated database relationships between objects in each of the multiple simultaneous hierarchies, wherein the relational data structure is based on a plurality of objects, the relational data structure comprising:

a first table providing means for:
    organizing a plurality of objects into at least a first and a second entries, wherein each object is related to at least one other object by a defined relationship;
    storing an object identifier associated with each of the plurality of objects;
    storing associated data to be accessed for each object identifier;

a second table providing means for:
    associating the object identifier of each of the plurality of objects with the object identifier of each related object to represent each defined relationship;

storing a hierarchy identifier, associated with each relationship for indicating that each relationship is associated with a particular one of the multiple simultaneous hierarchies, wherein a first relationship is designated between a first object and a second object in the first one of the multiple simultaneous hierarchies and a second relationship is designated between the first object and the second object in a the second one of the multiple simultaneous hierarchies; and a third table providing means for:
storing a summary description of each one of the multiple simultaneous hierarchies existing in the second table, having a first record representing a first one of the multiple simultaneous hierarchies and a second record representing a second one of the multiples simultaneous hierarchies.

3. A method of creating a relational database stored in a computer readable medium so that multiple simultaneous hierarchies can be defined without needing dedicated database relationships between objects in the multiple hierarchies, wherein the relational database includes a plurality of objects, each having an associated data to be accessed; said method comprising:

forming a first database table having a plurality of entries, each entry representing an object with an associated data to be accessed;

forming a second database table having a plurality of entries, each entry defining a relationship between two objects of said plurality of objects, wherein each entry is associated with at least one of the multiple simultaneous hierarchies by using hierarchy identifiers;

forming a third database table, said third database table having a first record representing a first one of the multiple simultaneous hierarchies and a second record representing a second one of the multiple simultaneous hierarchies;

in the second database table, designating a first relationship between a first object and a second object in associated with the first one of the multiple simultaneous hierarchies; and in the second database table, designating a second relationship between the first object and the second object associated with a second one of the multiple simultaneous hierarchies.

4. The method of claim 3 wherein said plurality of relationships include single parent and multiple parent hierarchies.

5. The method of claim 3 wherein said plurality of relationships include tree type structures.

6. The method of claim 5 wherein said relationship is between a parent and a child.

7. The method of claim 6 wherein each entry in said second database table further defines a direct or indirect parent-child relationship.

8. The method of claim 6 wherein each entry in said second database table further comprises a definition of a database structure to which said relationship is a part thereof.

* * * * *